Figure 1:
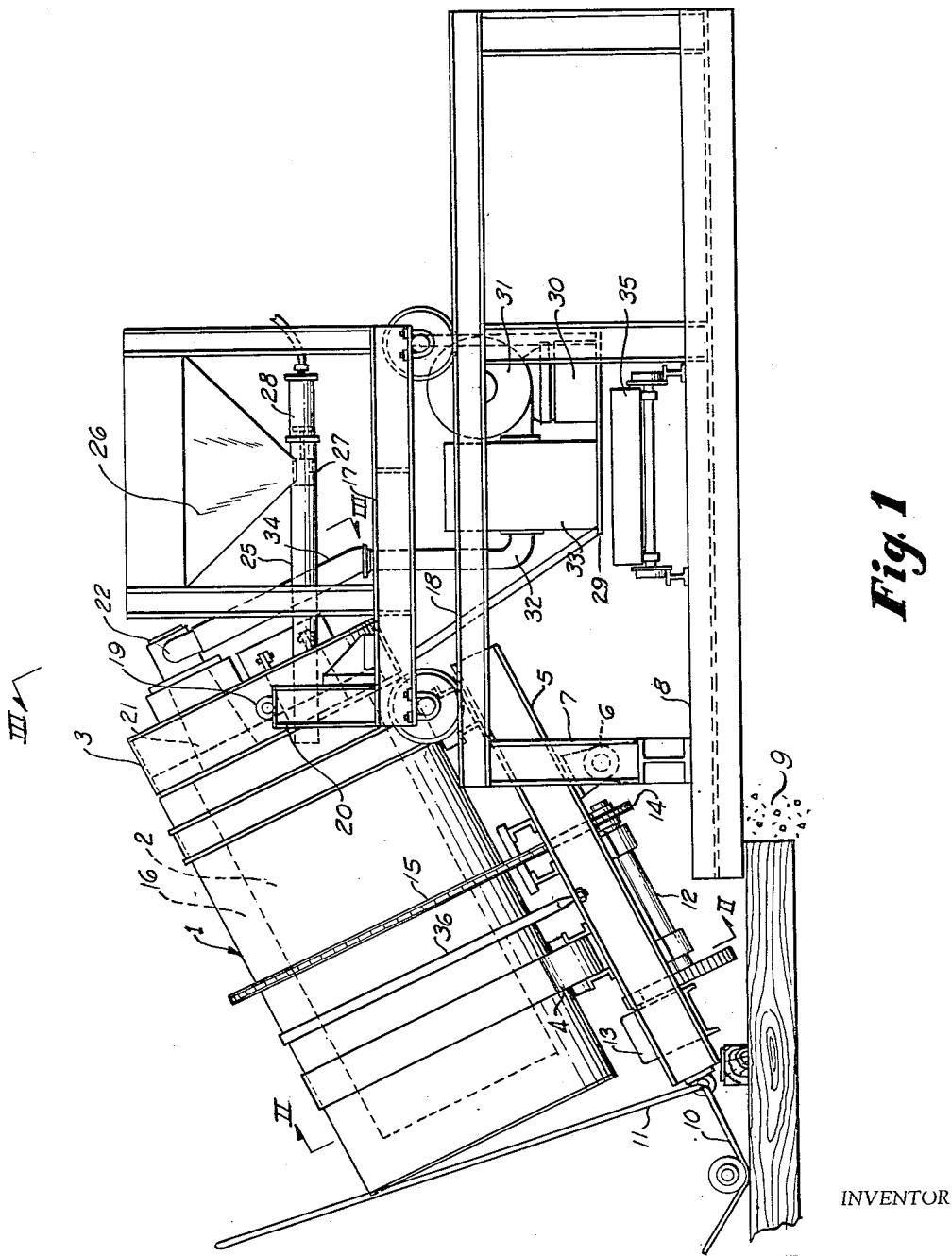

Sept. 17, 1957 L. E. SCHROTH 2,806,780
METHOD OF REDUCING IRON ORES
Filed April 6, 1955 2 Sheets-Sheet 1

INVENTOR
LAWRENCE E. SCHROTH
BY
William B. Wharton
ATTORNEY

Sept. 17, 1957 L. E. SCHROTH 2,806,780
METHOD OF REDUCING IRON ORES
Filed April 6, 1955 2 Sheets-Sheet 2
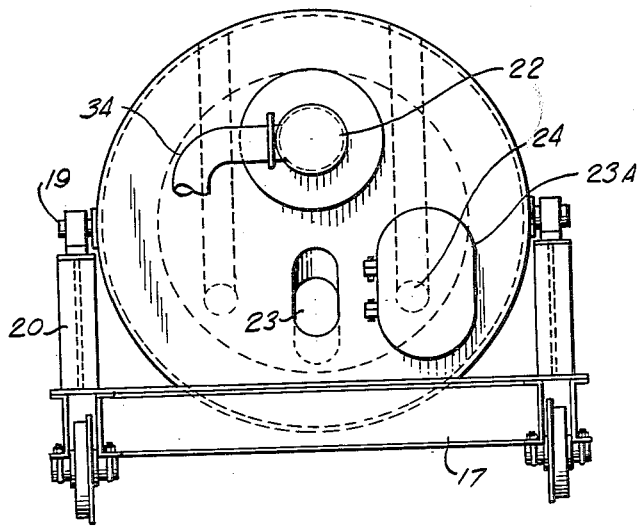
Fig. III
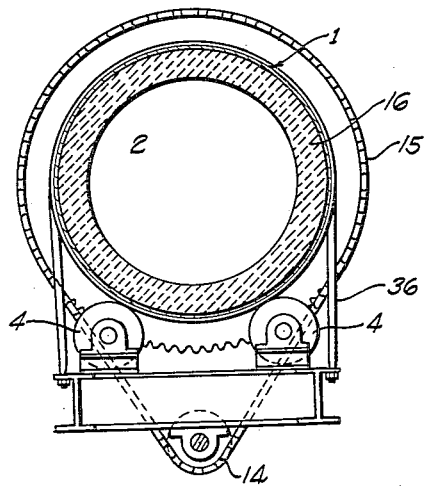
Fig. II
INVENTOR
LAWRENCE E. SCHROTH
BY
William B. Wharton
ATTORNEY

United States Patent Office 2,806,780
Patented Sept. 17, 1957

2,806,780
METHOD OF REDUCING IRON ORES

Lawrence E. Schroth, Pittsburgh, Pa., assignor to Combustion Processes Company, Pittsburgh, Pa., a corporation of Pennsylvania Application April 6, 1955, Serial No. 499,671

6 Claims. (Cl. 75—34)

This invention relates to the reduction of iron ores, by which term I intend to include those iron ores in which the iron and oxygen occur in chemical combination with other elements as well as the simpler iron oxides such as the hematites and magnetites and also to include flue dust. The method herein disclosed is to be considered as an improvement on the method disclosed in the patent to Norman J. Urquhart, No. 2,690,390, issued September 28, 1954.

In common with the method disclosed in the above-identified application, the method of this invention is directed to the reduction of iron ores in economical as well as in effective manner. Also the method of the present invention similarly is a batch process as distinguished from the various continuous processes directed to the same end.

In this instant method a batch-type, revoluble furnace is used and this furnace closed at both ends during the actual reduction treatment is mounted to decline away from its firing end. The furnace is fired throughout the treatment and carbon as in the form of coke, charcoal, coke breeze or an appropriate grade of coal is present. Throughout the continuance of the treatment the conditions of atmosphere, temperature and pressure which exist in any selected space within the furnace chamber are maintained in practical effect uniform throughout the length and diametric area of the chamber. This is accomplished by the firing, which maintains the entire area of the furnace chamber under burner control, and therefore obviates any wide variation in temperature or atmosphere within the bounds of the furnace chamber.

My invention is directed primarily to the saving of furnace time by introducing the charge in such manner that the heat from the burner fuel and the carbon of the charge is fully utilized in bringing the charge to and maintaining it at a reduction temperature. As corollaries to the increase in production of each individual furnace there are the advantages in the saving of burner fuel during the operation of reduction in that furnace and the decrease in investment cost of a plant comprising a battery of furnaces intended to produce a given total of metallic iron in a specified period of time.

This purpose I have effected in part by adopting the batch principle in the structure and operation of the furnace. In so doing I use a closed furnace declining from its firing end and maintain burner control of a reducing atmosphere, reducing temperature and slightly superatmospheric pressure uniform throughout the length and diametric area of the furnace throughout the treatment. Then after preheating the furnace chamber, I conserve that heat by introducing a mixed charge of finely divided iron ore and finely divided carbon slowly into the furnace chamber. This introduction is so gradual or in such small increments that the charge is rapidly raised to the reaction temperature of the carbon and the reduction temperature of the iron ore after it has been brought into the furnace chamber. My method therefore partakes in the advantages of both a batch process and a continuous process. Fundamentally it is a batch process with the advantages, inherent in a process of that type and those advantages will be fully described herein. Conformable to the requirements of a batch-type process, I employ a continuous-type feed to incorporate in the process the noted advantages of a slow continuous feed.

In connection with the above, it should be understood that if a mixed charge of iron ore and carbon be introduced in a mass or if those charge components be introduced separately but all of either at one time, all the charge present in the furnace is not brought at the same time into contact with the heat of the furnace atmosphere or the heated wall of the furnace chamber. Also when the furnace charge is introduced all at one time the charge tends to chill the furnace chamber and considerable time is required to bring all the iron ore of the charge to a reduction temperature.

The accompanying drawings illustrate in somewhat schematic manner one embodiment of a furnace in which the method of my invention can be practiced. In the drawings:

Fig. I is a side elevation of a furnace installation, showing the furnace mounting and means for charging and firing the furnace;

Fig. II is a cross-sectional view through the furnace and its immediate mounting and actuating means taken in the plane of the section line II—II of Fig. I;

Fig. III is an elevational view of the firing head of the furnace and the separate means for individual movement of the firing head and the elements associated therewith.

Referring first to the showing of a furnace usable in the process, reference numeral 1 designates a relatively short tubular furnace having a furnace chamber 2 closed at its end which is away from the firing head 3 of the furnace. The furnace is so mounted that it inclines a desired degree toward its closed end. It is necessary in the process that the furnace be rotated and accordingly it rests on rollers 4 carried by a platform 5 tiltable above pivot 6 on one of the standards 7 of a framework 8 mounted on a massive base structure 9. The proximate elements of means for tilting the furnace to different positions are shown as cables 10 and 11 attached to platform 5 and passing to suitably powered drums or reels (not shown). The furnace is rotated from shaft 12 geared to variable speed rotor 13, by connection of sprocket 14 on shaft 12 with a sprocket or circular rack 15 surrounding and attached to the shell of the furnace. The furnace is, of course, provided with a thick lining 16 of suitable refractory which defines the furnace chamber.

The firing head 3 which in its operative position stands close to the body of the furnace, is mounted on a carriage 17 movable longitudinally on tracks 18 on framework 8. Carriage 17 is propelled in any suitable manner, as by individually motorized wheels or by a motor geared to at least one opposed pair of wheels. Firing head 3 is tiltably supported for angular adjustment in conformity with the inclination of the furnace or trunnions 19 in uprights 20 on the carriage.

Extended through the shell and refractory structure of firing head 3 there is a burner port, or tunnel 21 to which a burner 22 is connected. In the lower region of the firing head there is a port 23 provided with a refractory-lined door 23a, for the extension of a charging duct into the furnace chamber. Also in the lower region of the firing head there are two flues 24 which extend horizontally from the furnace chamber into the refractory structure of the firing head and then extend upwardly of the firing head to the atmosphere. The charger assembly consists of charging duct 25 to which the charge material is fed from a hopper 26 and means such as a screw conveyor or intermittently actuated plunger, to feed the charge either in a slow dribble or in small increments into the furnace chamber. As shown the charger comprises a plunger 27 actuated by a fluid pressure cylinder 28.

Suspended from carriage 17 there is an auxiliary platform 29 disposed below and between tracks 18 on which carriage 17 travels. Auxiliary platform 29 carries an electric motor 30 which actuates blower 31 to which is connected a rigid duct 32 passing by way of control box 33 to a flexible duct 34 connected with burner 22. In control box 33 there are mechanical means for regulating and apportioning the supply of air and a suitable fuel such as gas or oil to the burner. The fuel is delivered from the control box in a separate duct (not shown).

To describe the operation of the furnace apart from the specific conditions of the operation conducted therein, combustion products of the burner pass along the upper region of the furnace chamber toward the closed end thereof and thence return to the flues in the firing head and outwardly therethrough to the atmosphere. If there is combustible material in the furnace chamber, products from the combustion of such material joins the burner products in their passage to discharge. It may be noted that with respect to the process for which the furnace is intended the burner should be of a sort which of itself is capable of maintaining a neutral or slightly reducing furnace atmosphere and which while so doing is capable of raising the temperature of the furnace chamber to a relatively elevated point. The charge can be introduced as desired by means of the charger assembly. Inasmuch as the firing head does not rotate with the body of the furnace, both firing and charging can be conducted while the furnace is rotated.

When the desired operation has been completed in the furnace, the firing head is retracted, and the body of the furnace is tilted to reverse the direction of its inclination and discharge the contents of the furnace chamber at the firing end thereof, as into the buggy indicated by reference numeral 35. A strap 36 embracing the body of the furnace holds the furnace on its rollers when the furnace is tilted into its discharging position.

It is to be understood that the drawings and the foregoing description are illustrative merely of furnaces which are usable in practicing the method of my invention. Any furnace which conforms to the requirements of that invention can equally well be used. One specific furnace has been disclosed herein because that specific furnace is one used in experimental work on the method.

To give a detailed description of that method, the furnace first is preheated by means of its associated burner. The iron ore which is in finely divided condition and which desirably has been preheated to drive off moisture is mixed with the carbon which is also finely divided and which desirably is metallurgical coke, although a suitable coal or charcoal in a similar condition alternatively can be used. In the mixture the iron ore predominates quantitatively. This mixed charge is introduced to the furnace chamber slowly and as has been noted by the slow operation of a screw conveyor, by the repeated action of a plunger acting on small increments of the charge mixture or in any other suitable manner. It is not possible numerically to define the rate of charge addition either quantitatively, proportionally or by total time consumed in introducing the charge, because all such considerations are variable with the capacity of the furnace chamber, the relative capacity of the burner and the total quantity of the charge which is treated in each operation of the furnace. It is possible to say that the charge addition should be so gradual that the charge mixture as it is introduced is brought uniformly and very rapidly to the reaction temperature of the carbon, with rapid progressive attainment of a reduction temperature by the individual particles of the iron ore. It may be noted generally, that the optimum period of time consumed in building up the furnace charge usually is from about 10 minutes to 60 minutes, or even longer depending on the other conditions of the process. During the steps of preheating the furnace and introducing the charge the furnace is rotated slowly.

During the preheating step air is swept out of the furnace chamber by the products of burner combustion and replaced by those combustion products. Desirably the burner is so operated during the preheating step that the furnace atmosphere is slightly reducing or at least neutral, so that any slag remaining from a previous operation will not be oxidized. As the charge is introduced and an increasing quantity of carbon is ignited, the furnace atmosphere becomes relatively rich in CO and substantially devoid of $O_2$. It is to be understood that burner firing and slow rotation of the furnace are continued throughout all or substantially all the time required to complete the treatment. During introduction of the charge, the charge is raised to a reducing temperature by burner firing and heat absorption from the wall of the furnace chamber, without dropping the furnace temperature below the range of reduction. When the charge has all been introduced, the temperature rises but desirably is held below a temperature at which free flowing slag is formed until the process of reduction is substantially complete through the entire particulate mass of the charge. Such temperature will vary with the sort of ore being processed but usually is within the approximate range of 2050° F. to 2150° F. Control of temperature below a liquid slagging point minimizes the loss of Fe to the slag and permits the addition of lime or other suitable flux to the furnace charge at any desired stage of the operation without incurring a substantial loss of Fe.

It is to be noted that the furnace is heated without stack draft. It is therefore possible to conduct the entire process under burner control. Also it is possible not only to maintain the existence of an effectively uniform atmosphere and temperature throughout the entire space within the furnace chamber but also to maintain a slight superatmospheric pressure which prevents infiltration of air into the furnace chamber. The continued burner control renders this uniformity possible even though the slow rotation of the furnace gradually causes the charge to migrate down the declination of the furnace and to gather in a mass adjacent the closed lower end of the furnace chamber. Throughout the process the furnace atmosphere continues to be rich in CO and substantially devoid of $O_2$. As an incident to burner control of the process, it is possible to utilize the excess of CO if the furnace atmosphere becomes unnecessarily rich in that gas. By allowing a regulated quantity of free air to enter the furnace chamber a regulated proportion of the CO can be burned to $CO_2$ with storage of additional heat in the refractory lining of the furnace.

It is particularly to be noted that the effective uniformity of conditions throughout the length of the furnace coupled with the control of such conditions prevents slag rings from being built up at any point along the length of the furnace chamber. This inhibition to the formation of slag rings which is possible only in bulk-type operations, is a matter of primary importance. In fact the tendency for that formation is the chief factor which has rendered continuous processes for the direct reduction of iron oxides commercially impractical. Such rings when formed prevent the successful operation of the furnace in which they form and have proven to be extremely difficult to remove from the refractory lining of the furnace.

When reduction has been completed burner operation is stepped up to raise the furnace to a slagging temperature of about 2400° F. to 2500° F. At such temperature and other existing conditions, continued rotation of the furnace tends to form a coherent ball, or body, or several of such balls, in the lower region of the furnace. Such balls are composed of iron particles agglomerated with and by slag. Usually the ball, or balls, lie in a pool of liquid slag which does not at this stage of the process pick up any substantial amount of Fe content from the charge. If the slag content of the ball or balls formed by the treatment is relatively low, they can be utilized as the charge of a melting furnace such as an open hearth furnace, electric furnace, cupola or blast furnace. Preferably, the balls are squeezed as under a press or are rolled while still hot, to express a large proportion of the slag if their slag content initially is high.

Turning to the feature in which the chief novelty of the present invention resides, as the charge of mixed iron ore and carbon begins to enter the furnace chamber the carbon of the charge is quickly raised to its reaction temperature with the addition of CO to the furnace atmosphere. As the inflow of charge continues or further increments of the charge are added, the carbon of the incoming charge is in turn raised to like temperature. During this feeding of the charge, the burner desirably is so operated as to expedite the elevation of the charge to a temperature within the reduction range. After the total charge has been introduced, the operation proceeds in the manner described above under the reducing effect of the reaction carbon and under the overall control of the burner operation. Clearly as stated, the operation after the introduction of the charge is purely a batch process. The manner of charge introduction does, however, conserve heat and shorten the time of treatment, and does increase the smooth progress of reduction. It is, therefore, an improvement in the economics and in some measure an improvement in the effectiveness of the reducing operation. It should be noted that the charge is in divided condition and that as it is introduced it is at once subjected both to direct burner heat and to heat delivered by the wall of the furnace chamber.

Experimental work in a pilot-scale furnace can be exemplified as follows:

EXAMPLE

A large supply of charge for reduction was made up of Georgia red hematite and metallurgical coke. Both the ore and the coke were in divided condition, being of a size to pass through a one-fourth inch screen. These charge ingredients were thoroughly mixed in the ratio of three parts of ore to one part of coke and this charge mixture was used in all the runs of the example.

The analysis of the ore (dry basis) was:

|  | Approx. percent |
|---|---|
| Total Fe | 43 |
| P | 0.355 |
| Mn | 3.11 |
| $SiO_2$ | 9.08 |
| S | .073 |
| $H_2O$ | 3.03 |

Water from the portion of the charge mixture used in each run was driven off by heat before the charge was fed to the furnace.

The analysis of the coke was:

|  | Percent |
|---|---|
| C | 77.0 |
| P | .038 |
| S | 1.05 |
| Ash | 11.28 |
| Volatiles | 10.5 |

The furnace used was identical in principle and similar in form to the furnace shown in the drawings. The interior dimensions of the furnace chamber were a 3 foot diameter and a length of 6 feet. It was fired by a burner using gas as a fuel which is designed to heat the space within a furnace chamber to a high temperature without the introduction of free oxygen. During the charging the speed of travel at the surface of the furnace chamber was 18 feet per minute. When the charge had been introduced the peripheral speed at the surface of the lining was reduced to 9 feet per minute. The furnace was preheated to about 2000° F. and was fired and rotated continuously during the introduction of the charge. The charge was introduced continuously during a period of about 10 minutes. The total time of treatment, maximum temperature and other statistics of each run are given in Table A which follows:

Table A

| Reduction Test | Total Charge, Pounds | | Fe Content, Pounds | Furnace Temp., Start of Charge, °F. | Furnace Temp., End of Charge, °F. | Time to 2,080° F. | Total Time | Final Temp., °F. | Product Recovered | |
|---|---|---|---|---|---|---|---|---|---|---|
| | Ore | Coke | | | | | | | Unpressed Balls, Pounds | Pressed Balls, Pounds |
| A | 600 | 200 | 258 | 1,930 | 1,600 | 2:15 | 3:00 | 2,450 | 42 | 250 |
| B | 600 | 200 | 258 | 2,200 | 1,500 | 2:15 | 3:10 | 2,480 | 65 | 208 |
| C | 600 | 200 | 258 | 1,750 | 1,550 | 2:35 | 3:05 | 2,450 | 153 | 204 |
| D | 600 | 200 | 258 | 2,000 | 1,700 | 2:35 | 3:05 | 2,450 | 80 | 244 |
| Total | 2,400 | 800 | 1,032 | | | | | | 340 | 906 |
| Average | 600 | 200 | 258 | 1,970 | 1,590 | 2:25 | 3:05 | 2,457 | 85 | 226 |

Since reduction takes place between 1000° F. and 2100° F. the above data clearly shows that the charge was rapidly brought well within the reduction temperature range during the charging period of ten minutes.

To prove the value of the product of these four reduction tests an average sample of 225 pounds of the pressed product, together with 52 pounds of Bessemer pig iron, was melted in an electric arc furnace, the results of which are tabulated below:

|  | lbs. |
|---|---|
| Charge | 225+52=277 |
| Metal recovered | 211 |
| Loss | 66 |

Assuming that all of the loss was from our product, then $$225 - 66$$

Metal recovered from our product ____ 159

159 divided by 225=70.6%—the metallic content of our product.

The portion of the product which was pressed showed that the amount of slag pressed from the balls was about 10%. Had all the product been pressed we would have had a total of 906 pounds plus (340×.90) equals 1212 pounds of pressed product. Also, if all the ball material had been pressed and melted we would have recovered 1212 pounds×70.6% equals 856 pounds of metal.

The ore contained 43% Fe, therefore 2400×.43 equals 1032 Fe contained in the total or charged. 856 divided by 1032 equals 83% recovery, based on the Fe content of the ore charged.

Analysis of the melt:

|  |  |
|---|---|
| Silicon | 0.35 |
| Manganese | 0.31 |
| Phosphorous | 0.312 |
| Sulphur | 0.069 |
| Carbon | 1.15 |

This analysis indicates that this product would be an excellent substitute for commercial scrap as an electric furnace charge. It would have the advantage of not being contaminated by undesirable, so called tramp metals, now so prevalent in commercial scrap.

A broad and important economic advantage of the process disclosed herein resides in the fact that it provides a highly efficient method of producing metallic iron from iron ores and carbonaceous material in such condition of fine division that neither of them is usable in a blast furnace. The crumbled ores and coke breeze usable in the instant process are starting materials the practical employment of which has long been desired.

I claim as my invention:

1. The method of reducing iron ore comprising the following steps: mixing the said iron ore in finely divided condition with finely divided carbon, introducing the particulate mixture of iron ore and carbon, with a screw type feed or the like, to insure a gradual progressive charging action, into a relatively short, closed treating chamber declining from its firing end, introducing a hot combustion atmosphere devoid of $O_2$ and containing CO simultaneously with the gradual progressive introduction of said particulate mixture, regulating the speed of said gradual progressive introduction of said mixture so as to rapidly raise the temperature of said mixture to a temperature at which reduction occurs, proceeding with the reduction of the iron ore after a complete charge of the mixture has been so introduced by continuing the introduction of the said hot combustion atmosphere to maintain the said treating chamber in a substantially uniform condition of temperature and atmosphere productive of reduction; and rotating the said treating chamber to agitate the particulate mixture, thereby to uniformly expose the said particulate mixture ot the hot combustion atmosphere and to rapidly effect a substantially complete reduction of the finely divided iron ore therein.

2. The method as set forth in claim 1, wherein the closed treating chamber is preheated to a temperature at which reduction of iron ore takes place prior to the introduction of said particular mixture.

3. The method as set forth in claim 1, wherein the temperature within said closed treating chamber is maintained at a point below that at which liquid slag is formed.

4. The method as set forth in claim 1, wherein the closed treating chamber is preheated to a temperature at which reduction of iron ore takes place prior to the introduction of said particulate mixture, and wherein the temperature within said closed treating chamber is maintained at a point below that at which liquid slag is formed.

5. The method as set forth in claim 1, wherein the rotation of said treating chamber is continued after substantially complete reduction has been produced to agglomerate the products thereof.

6. The method as set forth in claim 5, wherein the closed chamber is preheated to a temperature at which reduction of iron ore takes place.

References Cited in the file of this patent

UNITED STATES PATENTS

| | | |
|---|---|---|
| 2,397,993 | Urquhart | Apr. 9, 1946 |
| 2,654,669 | Urquhart et al. | Oct. 6, 1953 |
| 2,690,390 | Urquhart | Sept. 28, 1954 |